Jan. 18, 1927.
E. F. BLACKBURN
SPRING LUBRICATOR
Filed March 26, 1926
1,615,065
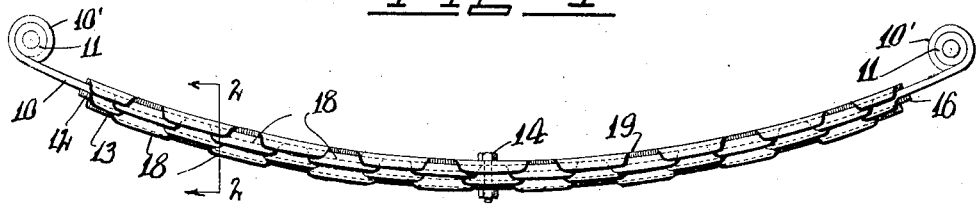
Fig 1
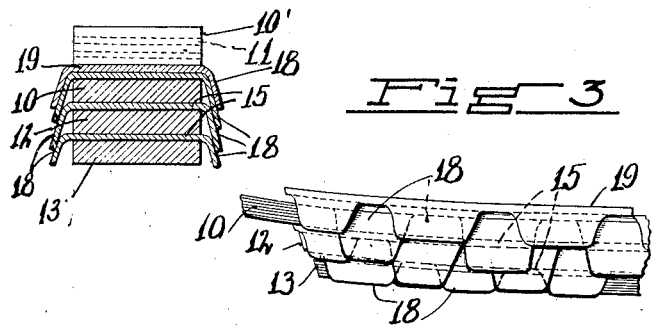
Fig 2  Fig 3
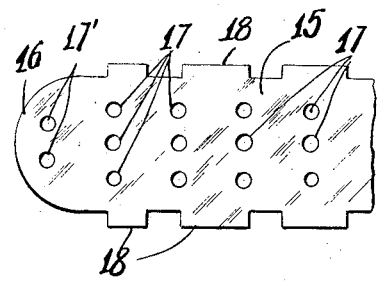
Fig 4
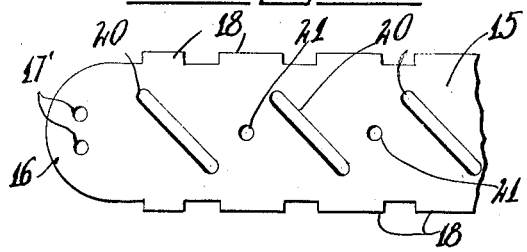
Fig 5
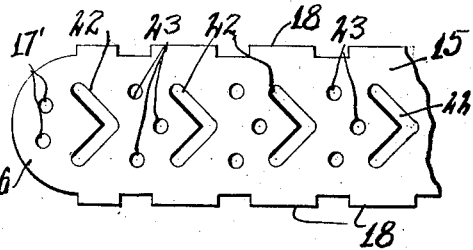
Fig 6
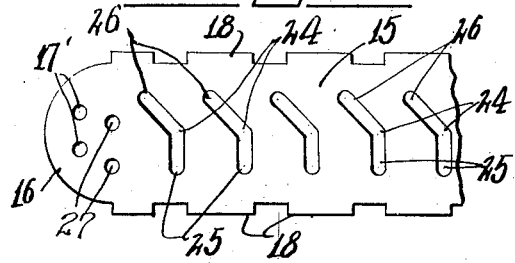
Fig 7
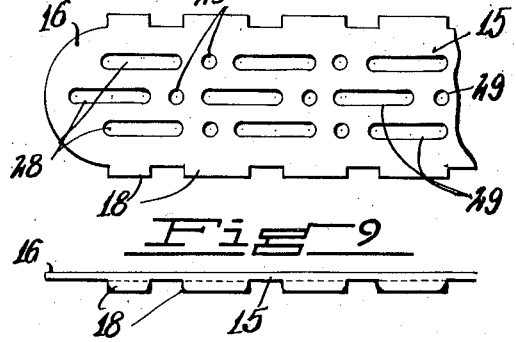
Fig 8
Fig 9
INVENTOR
Elbert F. Blackburn
BY
ATTORNEY Patented Jan. 18, 1927.

UNITED STATES PATENT OFFICE.

ELBERT F. BLACKBURN, OF LITTLERIVER, FLORIDA.

SPRING LUBRICATOR.

Application filed March 26, 1926. Serial No. 97,532.

This invention relates generally to leaf springs such as used on motor vehicles and the like, between the axles and the frame, to accomplish greater riding ease, the invention having more particular reference to an improved spring protector.

The invention has for an object the provision of an improved spring protector embodying a spring cover and a spring lubricator, which will protect the spring from dirt and grit of the road, and which will keep the spring lubricated, so as to insure easier riding.

A further object of the invention is to provide a spring protector of novel construction and arrangement of parts.

For further comprehension of the invention, and of the objects and advantages thereof, reference will be had to the following description and accompanying drawing, and to the appended claims in which the various novel features of the invention are more particularly set forth.

Fig. 1 of the drawing, is a side elevational view of a leaf spring, such as used on motor vehicles and the like, showing my improved spring protector in place thereon.

Fig. 2 is an enlarged sectional view taken on the line 2—2 of Fig. 1.

Fig. 3 is an enlarged fragmentary view of the leaf spring, as shown in Fig. 1, showing my improved spring protector in place thereon.

Fig. 4 is a fragmentary top plan view of my improved spring protector as shown in Fig. 1.

Fig. 5 is a similar view showing a modification thereof.

Fig. 6 is a similar view showing another modification thereof.

Fig. 7 is a similar view showing a further modification thereof.

Fig. 8 is a similar view showing a still further modification thereof.

Fig. 9 is a side elevational view thereof.

The master leaf 10 having its extremities rolled or otherwise curved, as at 10', to accommodate the spring bushings 11, the lower leaves 12 and 13, the center bolt 14, are those of leaf springs of common ordinary construction such as generally used on motor vehicles and the like.

As here embodied my improved spring protector comprises lubricators 15, preferably of metal, fibre, or any other suitable material, of similar width and length of the spring leaf to which same is to be applied and inserted, and having its extremities formed as at 16, to correspond to the extremities of the said spring leaf, and provided with a plurality of circular apertures 17, preferably arranged in three longitudinal lines or rows, and spaced opposite each other, with the possible exception of the similar apertures 17', which may be suitably arranged, depending upon the contour of the extremities of the said leaf spring, to which same is to be applied, the said apertures 17 and 17' being provided to accommodate graphite, grease or any suitable lubricant. The lubricators 15, are also provided with depending elements 18, or lugs, having curved sides, and straight extremities, the said depending elements 18 being formed or bent at right angles to the said spring lubricator 15, and suitably spaced or staggered, so as to completely cover the joint or seam between the leaf springs, as clearly shown in Fig. 3, of the accompanying drawing, it being understood that the said depending elements 18, are provided to prevent dirt and grit from interfering with the action of the said spring leaves.

It will be understood that my improved spring lubricator 15 as above described is inserted between the spring leaves.

As a means of fully covering or protecting the lower joint or seam between the master leaf 10 and the spring leaf 12, I have provided two spring covers 19, similar to the hereinbefore mentioned spring lubricator 15, it being obvious that the above mentioned apertures 17 and 17', for lubrication are not required, and that the above mentioned lugs 18, are staggered, as hereinbefore mentioned and set forth.

Referring in particular to Fig. 5 of the accompanying drawing, in which I have shown a modification of my improved spring lubricator provided with diagonal elongated apertures extending crosswise, and having a central circular aperture 21 located between the diagonal elongated apertures 20.

Referring in particular to Fig. 6, of the accompanying drawing, in which I have shown another modification of my improved spring lubricator provided with V shaped elongated apertures 22 extending crosswise, and having circular apertures 23, located between the V shaped elongated apertures 22, preferably arranged in a V, as will be permitted by the V shaped elongated apertures 22.

Referring in particular to Fig. 7, of the accompanying drawing, in which I have shown a further modification of my improved spring lubricator, provided with elongated apertures 24, having a straight portion 25, and an angular portion 26, said straight portion located crosswise; and having circular apertures 27, located adjacent to the above mentioned circular apertures 17', as may be permitted by the elongated apertures 24, and the circular apertures 17'.

Referring in particular to Fig. 8, of the accompanying drawing, in which I have shown a further modification of my improved spring lubricator, provided with elongated apertures 28, extending longitudinally, and staggered, preferably in rows, and having a circular aperture 29 located between the said elongated apertures 28.

It will be further understood, that the irregular shaped lubricating apertures, as hereinbefore described, are particularly adapted to more efficiently lubricate, inasmuch, as the said lubricating graphite, grease or the like, is more readily spread over the entire surface of the said leaf springs.

Having thus described my invention, what I claim as new, and desire to protect by Letters Patent of the United States is as follows:—

1. In a device of the class described having spring lubricators inserted between the leaves of a vehicle spring, the combination of a pair of upper spring covers, staggered lugs depending from said spring covers, and staggered lugs depending from said lubricators.

2. In a device of the class described having spring lubricators inserted between the leaves of a vehicle spring, a flexible casing comprising a pair of upper spring covers, staggered lugs depending from said spring covers, and staggered lugs depending from said lubricators.

3. In a device of the class described having spring lubricators inserted between the leaves of a vehicle spring, a flexible casing comprising a pair of upper spring covers, staggered lugs depending from said spring covers and bent at right angles thereto, and staggered lugs depending from said lubricators and bent at right angles thereto.

In testimony whereof I have affixed my signature.

ELBERT F. BLACKBURN.